United States Patent
Brack et al.

(12)

(10) Patent No.: US 6,486,294 B1
(45) Date of Patent: Nov. 26, 2002

(54) PRODUCTION OF POLY(CARBONATE-CO-ESTER) COPOLYMERS

(75) Inventors: Hans-Peter Brack, Etten-Leur (NL); Jan Pleun Lens, Breda (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/683,807

(22) Filed: Feb. 19, 2002

(51) Int. Cl.$^7$ ................................................ C08G 64/00
(52) U.S. Cl. ........................ 528/198; 528/196; 525/461; 525/462
(58) Field of Search ................................ 528/196, 198; 525/461, 462

(56) References Cited

U.S. PATENT DOCUMENTS 4,935,785 A    6/1990   Wildi et al.

FOREIGN PATENT DOCUMENTS

JP              63199735       8/1988
WO              WO 00/26274    5/2000

*Primary Examiner*—Terressa M. Boykin
(74) *Attorney, Agent, or Firm*—Oppedahl & Larson LLP

(57) ABSTRACT

A poly(carbonate-co-ester) block copolymer is synthesized using synthetic strategies that can be incorporated into conventional melt facilities that are commonly used in the production of polycarbonate polymers. The polycarbonate block of the poly(carbonate-co-ester) copolymer is derived from a polycarbonate reaction mixture comprising an aromatic dihydroxy compound and a carbonic acid diester, such as bisphenol A and diphenyl carbonate, respectively. The second block of the copolymer is derived from a polyester prepolymer, the polyester prepolymer comprising a diol, diacid or diester, and at least one monomer that is selected to advantageously incorporate desired properties into the poly(carbonate-co-ester) copolymer. The polyester prepolymer is introduced to the polycarbonate reaction mixture to form the poly(carbonate-co-ester) copolymer. Properties of the copolymer can be altered by varying numerous conditions of the reaction.

70 Claims, 2 Drawing Sheets

PRODUCTION OF POLY(CARBONATE-CO-ESTER) COPOLYMERS

BACKGROUND OF INVENTION

The present invention relates to the production of poly(carbonate-co-ester) soft block copolymers by introducing synthetic steps into a process commonly used to synthesize polycarbonates, the melt transesterification method.

Block copolymers possess unique properties which allow for the modification of thermal, mechanical, and other such properties of a polymer that could not be achieved through the synthesis of other types of polymers, such as random copolymers. Poly(carbonate-co-ester) copolymers are known in the art as disclosed in U.S. Pat. No. 4,935,785 and are representative of soft-block copolymers. As compared to polycarbonate homopolymers of the same molecular weight, soft-block copolymers possess improved Theological properties that result in better replication of molded articles.

A variety of block copolycarbonates are known in the art and have been synthesized using the interfacial method, a process which undesirably requires the use of phosgene. Patent Cooperation Treaty (PCT) Pat. Application No. WO 00/26274 discloses the synthesis of block copolycarbonates using a previously-synthesized polyester intermediate with an organic dihydroxy compound and phosgene. Similarly, Japan Patent No. 63199735 discloses the preparation of polycarbonate copolymers by condensation of a prepolymer, which is obtained by a reacting styrene resin and a polycarbonate oligomer with an aromatic dihydroxy compound. The synthesis of these polycarbonate copolymers uses the interfacial method.

In addition, some low molecular weight diacid monomers are not easily incorporated. Several examples of copolyestercarbonate compositions containing adipic acid exist in the literature. See, for example, JP 61149901 (Idemitsu Kosan Co., Ltd., 1986), JP 19660527 (Asahi Chemical Industry Co., 1969), J. Polym. Sci., Polym. Chem. Ed. (1967), 5(4), 927–30. However, these copolymers have been made using adipoyl chloride in the interfacial process; a route which is not very viable commercially. Direct incorporation of diacids using the interfacial process is only possible using longer-chain diacids such as sebacic and dodecanoic acid (DDDA).

SUMMARY OF INVENTION

The invention discloses the production of a poly(carbonate-co-ester) block copolymer. The method for producing the poly(carbonate-co-ester) block comprises the steps of:

(a) creating a reaction mixture comprising an aromatic dihydroxy compound (e.g., bisphenol A ("BPA"), a carbonic acid diester (e.g., diphenyl carbonate ("DPC"), and a catalyst, (b) mixing a polyester prepolymer with the reaction mixture, said polyester prepolymer comprising a diacid, diol or diester, and at least one monomer selected to incorporate the desired properties into the poly(carbonate-co-ester), and optionally pre-reacted with a carbonic acid diester to improve its incorporation and reaction, (c) bringing the reaction mixture to thermal equilibrium in a melted state, wherein the reaction mixture under thermal equilibrium further comprises a volatile component and a polycarbonate polymer, and (d) removing the volatile component from the reaction mixture to increase the molecular weight of the polycarbonate.

The method of the invention can be incorporated into conventional melt facilities used in the production of polycarbonates, thereby eliminating the need for phosgene and other solvents.

DETAILED DESCRIPTION

Figure 1:
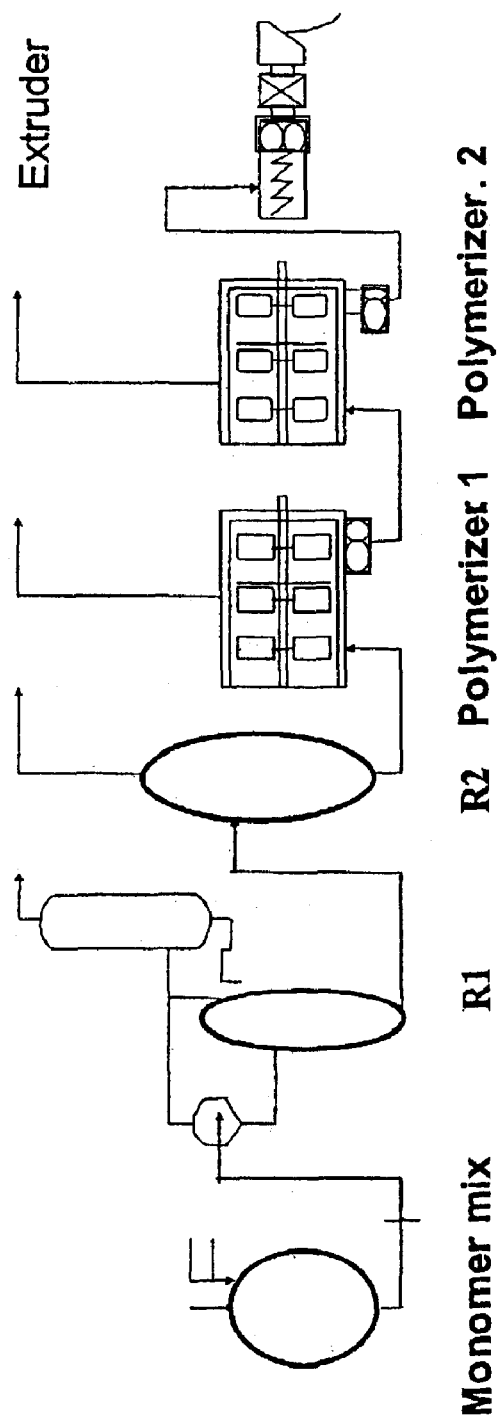
FIG. 1 shows the schematic of a typical polycarbonate melt facility used in the production of the poly(carbonate-co-ester)

The synthetic strategies of the invention present a new and efficient manner for the production of poly(carbonate-co-ester) soft-block copolymers. The copolymer of the current invention consists of two or more polymer blocks, one type of block comprising a polycarbonate block and the second type of block comprising a polyester with any number of possible monomers. The polycarbonate blocks are synthesized using the conventional melt transesterification process. This process eliminates the need for phosgene and other chlorine based compounds and results in a block copolymer with optical properties of high quality. The current invention achieves a further objective by incorporating the overall synthesis of the block copolymer into the melt transesterification process involved in the synthesis of the polycarbonate block. This advancement minimizes the total number of reactors required for the synthesis of the block copolymer.

This invention in addition solves the volatility/overhead issues of most simple diol or diacid monomers. Most of these have boiling points similar or even lower than DPC and BPA: DPC 301–302° C., BPA: 220° C./4 mm, 1,6-Hexanediol: 250° C., ε-caprolactone: 97° C./10 mm, adipic acid: 337.5° C., dodecanoic acid 245° C./10 mm. This means that the recovery/recycle of the devolatized phenol from the overhead becomes more complicated due to simultaneous devolatization of new additional reaction mixture components (the comonomers). The polyester pre-polymers used in this invention have a high enough MW and thus low enough volatility that they are not devolatized to the overhead system.

The poly(carbonate-co-ester) soft-block copolymer is synthesized from at least two polymer blocks. The first polymer block is the polycarbonate block and is derived from a dihydroxy compound and a carbonic diester, preferably bisphenol A and diphenyl carbonate, respectively. The second polymer block is derived from a polyester prepolymer having a chemical structure of:

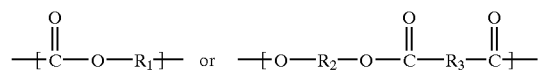

The groups $R_1$, $R_2$, $R_3$ selected for the polyester prepolymer may be the same or different and may vary within the same prepolymer and include aryl, aralkyl, linear or branched $C_1$–$C_{40}$ alkyl, and linear or branched $C_1$–$C_{40}$ alkoxy groups. Preferred R groups are those that are readily available and inexpensive, for example linear aliphatics: C2, C4, C5, C6, C12, C36, branched aliphatics: CH2C(CH3)

2CH2, and phenyl. The end groups of the polyester prepolymer are selected based upon the need of this oligomer to react with the polycarbonate block via transesterification or esterification. Thus, appropriate end groups of the polyester prepolymer include alcohol, carboxylic acid, alkyl ester, phenyl ester, arylester and arylkylester groups. The selected end groups of the polyester prepolymer may be either identical or different. Different polyester end groups (diol or diacid) and molecular weights can be achieved by simply varying the stoichiometric imbalance of the two different monomer types used to make polyesters, namely the diacid and diol monomers. For example, the effect of stoichiometric imbalances on end group types and molecular weight is discussed in Principles of Polymerization, by George Odian, 1991, John Wiley & Sons, Inc. The diacid and diol monomers serve as initiators in the case of polycaprolactone prepolymers and should be selected to introduce a group into the prepolymer that will react in the melt PC process. Thus, preferred initiators introduce acid, alcohol, or ester end groups onto the prepolymer. These end groups then react with BPA/DPC/PC oligomer.

The polyester prepolymer can be synthesized or selected from commercially available compounds. It is preferable to use a polyester prepolymer having a molecular weight less than 3250 g/mol. Synthesis of the polyester prepolymer affords a greater degree of freedom in determining the properties of the block copolymer end-product, while selecting the polyester prepolymer from commercially available compounds minimizes the need for further on-site reactors. Synthesizing the polyester prepolymer is accomplished by the polymerization of one or more diacid monomers with one or more diol monomers. Without limitation, the diacid monomer may be a $C_2$ to $C_{36}$ diacid, such as carbonic acid, dxalic acid, succinic acid, glutaric acid, adipic acid, pimelic acid, sebacic acid, decanedioic acid, dodecanedioic acid, $C_{36}$ acid, isophthalic acid and terephthalic acid. The diol monomer, without limitation, may be a $C_2$ to $C_{36}$ diol, such as hexanediol, ethylene glycol, propylene glycol, butanediol, pentanediol, neopentyl glycol, heptanediol, octanediol, decanediol, and dodecanediol.

The polyester prepolymer may also be purchased commercially. Examples of commercially available diols or diacids that may serve as suitable polyester prepolymers are presented in Table 1.

TABLE 1

| Product Name | Priplast 3196 | CAPA 504005 | CAPA 006005 |
|---|---|---|---|
| Molecular Weight (g/mol) | 3000 | 2000 | 1200 |
| Initiator | | aliphatic polycarbonate | dodecanoic diacid |
| Monomers | hydrogenated dimerized $C_{36}$ fatty acid, hexane diol | ε-caprolactone | ε-caprolactone |
| Endgroups | diacid | diol | diacid |

The endgroups of the polyester prepolymers may be modified to different endgroups. Polyester prepolymers having diphenyl ester endgroups can be prepared from polyester prepolymers possessing diacid endgroups by reacting the polyester prepolymer with DPC. Use of diphenyl ester endgroups minimizes the amount of phenol to be devolatized and any pressure build up due to formation of $CO_2$ liberated in the reaction below. The direct reaction of the acid group with a carbonate yields an unstable reaction intermediate. The ester endgroup is preferred to build molecular weight more quickly if no prereaction step is used.

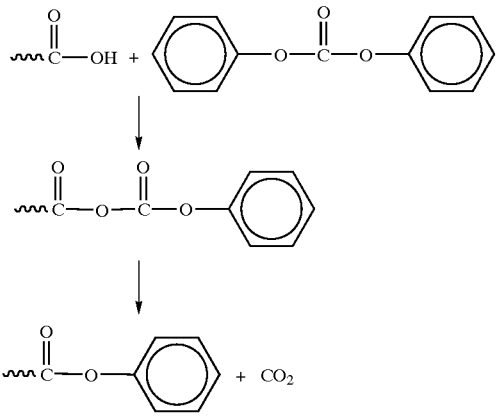

To produce the poly(carbonate-co-ester) copolymer from polycarbonate blocks or oligomers and the polyester prepolymer, the polyester prepolymer is introduced to a reaction mixture in which the polycarbonate blocks or oligomers are being synthesized from BPA and DPC. Introduction of the polyester prepolymer can occur at various stages of the synthesis of the polycarbonate block polymer. Producing the polycarbonate blocks or oligomers using conventional melt processing facility as shown in FIG. 1, has several processing steps, including: 1) forming a reaction mixture by mixing BPA and the DPC together in the presence of a suitable catalyst; 2) bringing the reaction mixture to thermal equilibrium in a melted condition until a polycarbonate polymer and the volatile byproduct (for example, phenol) are present and in equilibrium with BPA and DPC; and 3) increasing the molecular weight of the polycarbonate polymer by removing the phenol from the reaction mixture. The process of establishing a molten reaction mixture at thermal equilibrium may be carried out by first mixing unmelted materials and then heating to form an equilibrated melt, by pre-melting separate portions of the materials and then combining them, or combinations thereof.

The polyester prepolymer may be added to the reaction mixture of BPA and DPC during any of the above steps. However, a preferred method if a di-ester or diol is used is to add the polyester prepolymer to the reaction mixture after thermal equilibrium has been achieved. Under thermal equilibrium, the BPA and DPC form a polycarbonate polymer and a volatile component, namely phenol. The molecular weight of the polycarbonate polymer is increased by removing the phenol. If a diacid is used it needs to be pre-reacted to form a di-ester, and thus it is preferable to add the diacid polyester prepolymer directly in the beginning to the reaction mixture of BPA, DPC, and catalyst under atmospheric pressure. This allows the diphenyl ester of the diacid to form prior to applying vacuum to remove phenol and increase the molecular weight. By regulating the removal of the phenol from the reaction mixture under thermal equilibrium, the polyester prepolymer can be added at specific points in time that correlate to the polycarbonate block or oligomer having achieved a desired molecular weight.

Once the polyester prepolymer has been added to: the reaction mixture of BPA and DPC in which the polycarbonate block is synthesized, the functional endgroups of the polyester prepolymer react via transesterification or esterification with the polycarbonate blocks to form the block-polycarbonate-block-polyester copolymer. The characteristic of the copolymer formed is dependent upon the amount of the polyester prepolymer added to the BPA/DPC mixture. Desirable ranges of the amount of polyester prepolymer added range from about 0.1to 50 weight percent relative to the amount of the monomer BPA. It is desirable for the poly(carbonate-co-ester) to have a molecular weight of 10,000 to 100,000 g/mol as measured by GPC and relative to polystyrene standards, preferred is 20,000 to 80,000 g/mol, and most preferred is 25,000 to 60,000.

The compounds made using the method of the invention are unique, specifically in terms of the identity of the comonomers, their exact content or proportions relative to BPA, and the blocky structure. The prepolymers, are of sufficient molecular weight that they are not readily soluble in dichloromethane to give a low viscosity solution which is then easy to handle in the interfacial PC polymerization method. Thus, the present invention further provides poly (carbonate-co-ester) soft-block copolymer compositions. The compositions of the invention,comprise at least one region of a polycarbonate (formed from a diarylcarbonate and a bisphenol) and one region of a polyester.

In the case where the polyester is a derivative of a diacid, the molar ratio of components in the composition can be expressed by the formula:

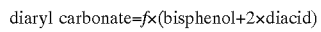

diaryl carbonate=$f$x(bisphenol+2×diacid)

where f is preferably between 1 and 1.3, more preferably between 1.05 and 1.1, and most preferably 1.08.

In the case where the polyester is a derivative of a diol, the molar ratio of components in the composition can be expressed by the formula:

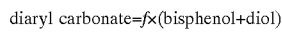

diaryl carbonate=$f$x(bisphenol+diol)

where f is preferably between 1 and 1.3, more preferably between 1.05 and 1.1, and most preferably 1.08. Empirically it has been observed that more DPC is needed in the case of diacids than diols or diphenyl esters. This may result from a need to drive the reaction harder due to intermediate formation etc. (see previous reaction scheme for acids).

In the case where the polyester is a derivative of a diacid with added diphenyl ester end groups, the molar ratio of components in the composition can be expressed by the formula:

diaryl carbonate+diphenylester prepolymer=$f$×bisphenol where f is preferably between 1 and 1.3, more preferably between 1.05 and 1.1, and most preferably 1.08.

The copolymer compositions of the invention have Tg values of from about 110 to 160 degrees C. and preferably between about 120 to 150 degrees C. The molecular weight of the copolymer is preferably in the range of $2 \times 10^4$ to $8 \times 10^4$ g/mol, for example between about 25,000 and 60,000. In addition, the compositions will preferably contain less than 3 weight percent, more preferably less than 2 weight percent, still more preferably less than 1 weight percent and most preferably less than 0.4 weight percent of unincorporated polyester prepolymer. The amount of unincorporated polyester prepolymer can be determined by proton and carbon NMR spectroscopy. Such minimal residual amount of polyester prepolymer are achieved by controlling the ratio of components, as discussed above, and by controlling such process parameters as reactor and stirrer or screw designs, stirring speed to optimize the mixing of the reactants and reaction time, temperature and pressure to optimize the reaction kinetics and equilibrium.

Having described the invention in detail, the following examples are provided. The examples should not be considered as limiting the scope of the invention, but merely as illustrative and representative thereof.

EXAMPLE 1

A diacid polyester prepolymer was ordered from a commercial supplier to meet the following specifications: carboxylic acid end groups, containing hydrogenated dimerized $C_{36}$ fatty acid in the prepolymer backbone, and having a molecular weight of about 1,300 g/mol. The supplied polymer, identified here as Premolecular A, was used to make poly(carbonate-co-ester) copolymers. The monomers DPC (25.30 g; 0.118 mol) and BPA (24.55 g; 0.107 mol) and the diacid polyester prepolymer (Prepolymer A, 1.08 g) were prereacted with a catalyst for 1 hour at 230° C. 1 atm of nitrogen in a batch reactor tube. Tetramethylammonium hydroxide (TMAH) and NaOH served as catalysts and were added to the reaction mixture as an aqueous solution (100 µL) in the molar ratios of $2.5 \times 10^{-4}$ for TMAH and $1.5 \times 10^{-6}$ or NaOH relative to BPA. after the prereaction, the polymerization reaction was conducted under increasing temperature and decreasing pressure as a function of time according to the following reaction profile in Table 2:

[t2]

TABLE 2

| Time (min) | Temp. (° C.) | Pres. (mbar) |
|---|---|---|
| 10 | 180 | 1013 |
| 60 | 230 | 170 |
| 30 | 270 | 20 |
| 30 | 300 | 0.5.–1.6 |

After the final reaction stage at 300° C. and 0.5–1.6 mbar, butyl tosylate was added in a toluene solution as a quenching agent in a molar ratio of 6 times the molar concentration of NaOH. The copolymer product was purified by dissolving it in chloroform and followed by precipitation with methanol. The product was isolated by filtration and dried under vacuum at 50° C. Differential scanning calorimetry (DSC) indicated a glass transition temperature ($T_g$) of 133° C. The molecular weight Mw was determined to be $5.10 \times 10^4$ g/mol via gel permeation chromatography (GPC) using a 1 mg/ml polymer solution in methylene chloride versus polystyrene standards. The molar ratio of reactants for BPA, DPC and a diacid polyester prepolymer in this example is given by the following expression: DPC=1.08×(BPA+2×acid). Proton and carbon NMR of the purified polymer confirmed that the polyester prepolymer was chemically incorporated and that the structure was that of a block copolymer and that there was less than 1.3% by weight of unincorporated polyester prepolymer.

EXAMPLE 2

The conditions and steps in accordance with Example 1 were repeated, except that a different prepolymer was initially synthesized and substituted for the polyester prepolymer Prepolymer AA prepolymer having diphenyl ester end groups was prepared from the diacid polyester prepolymer Prepolymer A (18.1 g) with DPC (8.9 g/mol). The molar ratio of the DPC to the diacid was 3:1. The reaction was conducted at a temperature of 220° C. under 1 atm of nitrogen and used TMAH as a catalyst in a molar ratio of $4.25\times10^{-6}$ with respect to the diacid. After a one hour reaction time, the diphenyl ester capped prepolymer was purified by vacuum distillation to remove the phenol byproduct. The structure of the diphenyl ester capped prepolymer was confirmed by NMR.

The synthesized diphenyl ester (1.05 g), DPC (25.1 g, 0.117 mol) and BPA (24.9 g, 0.109 mol) were charged together under the conditions as given in Example 1 (omitting the prereaction of diester, DPC and BPA, as previously noted) and further set forth in Table 2. The reaction was quenched and the product purified and analyzed as in Example 1. The glass transition temperature ($T_g$) of the copolymer product was determined by DSC to be 136° C. The molecular weight Mw was determined to be $4.30\times10^4$ g/mol via CPC using a 1 mg/ml polymer solution in methylene chloride versus polystyrene standards. The molar ratio of reactants for BPA, DPC and a diphenylester polyester prepolymer in this example is given by the following expression: DPC+DPE=1.08×BPA. Proton and carbon NMR of the purified polymer confirmed that the polyester prepolymer was chemically incorporated and that the structure was that of a block copolymer and that there was less than 0.4% by weight of unincorporated polyester prepolymer.

EXAMPLE 3

The monomers DPC (25.0 g; 0.116 mol) and BPA (24.5 g; 0.107 mol) were charged together with the diacid polyester prepolymer Prepolymer A (1.42 g). TMAH and NaOH served as catalysts and were added to the reaction mixture as an aqueous solution (100 µL) in the molar ratios of $2.5\times10^{-4}$ for TMAH and $1.5\times10^{-6}$ for NaOH relative to BPA. The polyester prepolymer and DPC and BPA monomers were first prereacted for one hour at 230 degrees Celsius under nitrogen at atmospheric pressure. Then the polymerization reaction was conducted under increasing temperature and decreasing pressure as a function of time according to the following reaction profile in Table 3:
[t3]

TABLE 3

| Time (min) | Temp (° C.) | Pres. (mbar) |
|---|---|---|
| 10 | 180 | 1013 (1 atm) |
| 30 | 180 | 130 |
| 30 | 180 | 65 |
| 30 | 220 | 65 |
| 30 | 220 | 13 |
| 30 | 270 | 13 |
| 30 | 270 | 8 |
| 30 | 270 | 0.5–1.6 |
| 60 | 300 | 0.5–1.6 |

The reaction was quenched and the product purified and analyzed as in Example 1. The glass transition temperature ($T_g$) of the copolymer product was determined by DSC to be 128° C. The molecular weight Mw was determined to be $4.14\times10^4$ g/mol via GPC using a 1 mg/ml polymer solution in methylene chloride versus polystyrene standards. Proton and carbon NMR of the purified polymer confirmed that the polyester prepolymer was chemically incorporated and that the structure was that of a block copolymer and that there was less than 1.0% by weight of unincorporated polyester prepolymer.

EXAMPLE 4

The monomers DPC (25.0 g; 0.116 mol) and BPA (24.4 g; 0.107 mol) were charged together with the diacyl-ester prepolymer Prepolymer A (2.36 g). TMAH and NaOH served as catalysts and were added to the reaction mixture as an aqueous solution (100 µL) in the molar ratios of $2.5\times10^{-4}$ for TMAH and $1.5\times10^{-6}$ for NaOH relative to BPA. The polyester prepolymer and DPC and BPA monomers were first prereacted for one hour at 230 degrees Celsius under nitrogen at atmospheric pressure. The polymerization reaction was conducted according to the following reaction profile in Table 3 and quenched, purified and analyzed as detailed in Example 1. The glass transition temperature ($T_g$) of the copolymer product was determined by DSC to be 111° C. The molecular weight Mw was determined to be $4.16\times10^4$ g/mol via GPC using a 1 mg/ml polymer solution in methylene chloride versus polystyrene standards. Proton and carbon NMR of the purified polymer confirmed that the polyester prepolymer was chemically incorporated and that the structure was that of a block copolymer and that there was less than 2.6% by weight of unincorporated polyester prepolymer.

EXAMPLE 5

The monomers DPC (25.0 g; 0.117 mol) and BPA (24.6 g; 0.108 mol) were charged together with the diol polyester prepolymer CAPA 504005 (1.27 g). TMAH and NaOH served as catalysts and were added to the reaction mixture as an aqueous solution (100 µL) in the molar ratios of $2.5\times10^{-4}$ for TMAH and $1.5\times10^{-6}$ for NaOH relative to BPA. The polymerization reaction was conducted according to the following reaction profile in Table 4:
[t4]

TABLE 4

| Time (min) | Temp. (° C.) | Pres. (mbar) |
|---|---|---|
| 10 | 180 | 1013 (1 atm) |
| 60 | 230 | 170 |
| 30 | 270 | 20 |
| 60 | 300 | 0.5–1.6 |

The copolymer product was quenched, purified and analyzed as detailed in Example 1. The glass transition temperature ($T_g$) of the copolymer product was determined by DSC to be 130° C. The molecular weight Mw was determined to be $5.44\times10^4$ g/mol via GPC using a 1 mg/ml polymer solution in methylene chloride versus polystyrene standards. The molar ratio of reactants for BPA, DPC and the diol polyester prepolymer in this example is given by the following expression: DPC=1.08×(BPA+diol). Proton and carbon NMR of the purified polymer confirmed that the polyester prepolymer was chemically incorporated and that the structure was that of a block copolymer and that there was less than 2.3% by weight of unincorporated polyester prepolymer.

EXAMPLE 6

The conditions and steps in accordance with Example 5 were repeated, except: 1) 22.3 g (0.977 mol) of BPA and 2.70 g of the diol polyester prepolymer Priplast 3196 were charged to the batch reactor tube. The glass transition temperature ($T_g$) of the copolymer product was determined to be 125° C. and the molecular weight Mw was determined to be $2.95\times10^4$ g/mol versus polystyrene standards. Proton and carbon NMR of the purified polymer confirmed that the polyester prepolymer was chemically incorporated and that the structure was that of a block copolymer and that there was less than 0.9% by weight of unincorporated polyester prepolymer.

EXAMPLE 7

The monomers DPC (25.1 g; 0.117 mol) and BPA (24.4 g; 0.108 mol) were charged together with the diacid polyester prepolymer CAPA 006005 (1.3 g). Tetramethylammonium hydroxide (TMAH) and NaOH served as catalysts and were added to the reaction mixture as an aqueous solution (100 µL) in the molar ratios of $2.5 \times 10^{-4}$ for TMAH and $1.5 \times 10^{-6}$ for NaOH relative to BPA. The diacid prepolymer and monomers were prereacted for one hour at 230 degrees Celsius under nitrogen at atmospheric pressure and then the polymerization reaction was conducted according to the following reaction profile in Table 4. The copolymer product was quenched, purified and analyzed as detailed in Example 1. The glass transition temperature ($T_g$) of the copolymer product was determined by DSC to be 132° C. The molecular weight Mw was determined to be $5.25 \times 10^4$ g/mol via GPC using a 1 mg/ml polymer solution in methylene chloride versus polystyrene standards. Proton and carbon NMR of the purified polymer confirmed that the polyester prepolymer was chemically incorporated and that the structure was that of a block copolymer and that there was less than 2.5% by weight of unincorporated polyester prepolymer.

Comparative Examples

Example 1 was repeated but instead no polyester prepolymer was charged to the reactor tube. The polymerization was allowed to proceed for various times to achieve molecular weights of $3.8 \times 10^4$ g/mol (Comparative Example 1), $4.44 \times 10^4$ g/mol (Comparative Example 2) and $5.29 \times 10^4$ g/mol (Comparative Example 3). The measured glass transition temperatures for the resulting products were 144, 146 and 148 degrees C., respectively.

EXAMPLE 8

Figure 2:
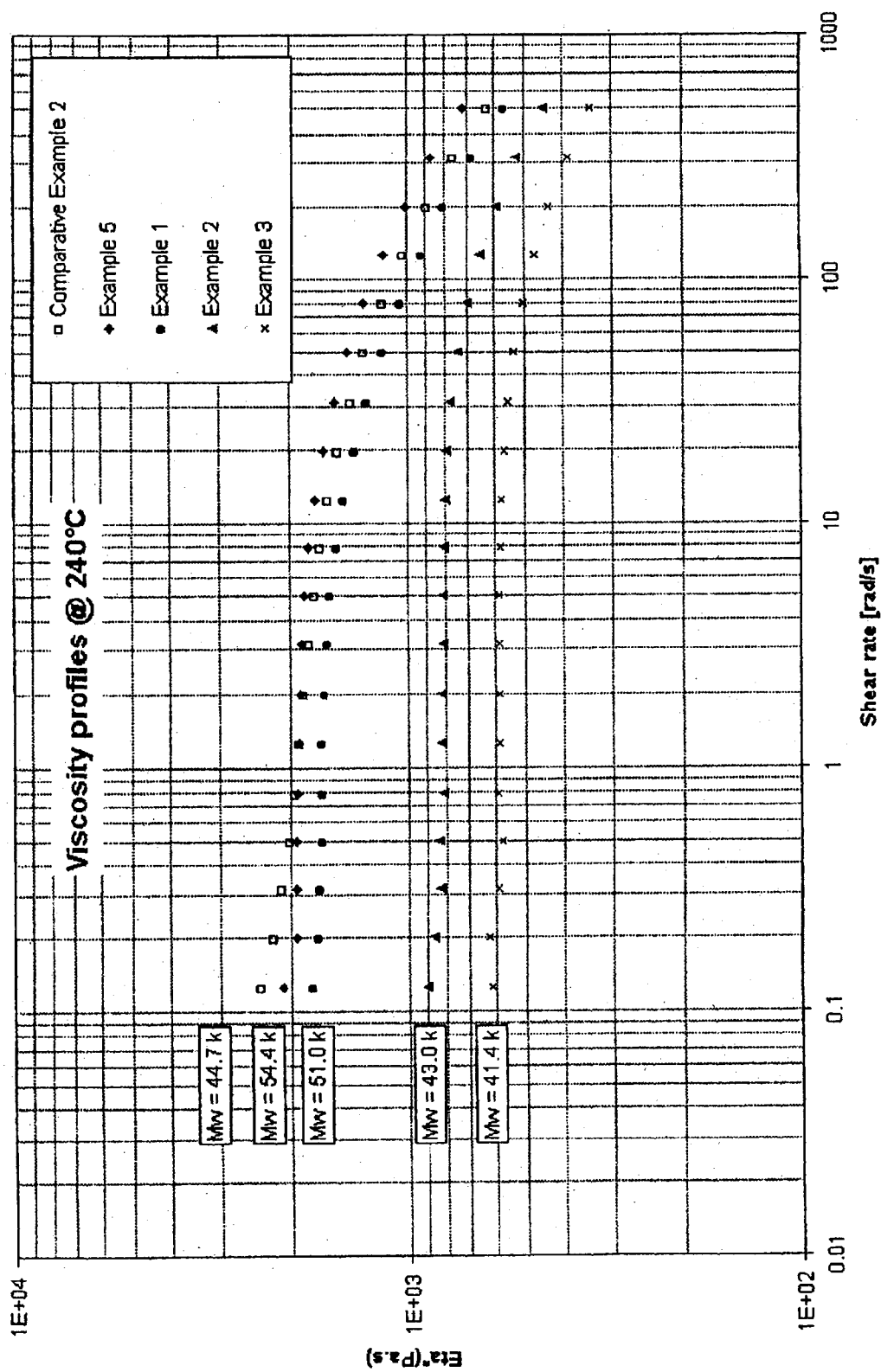
FIG. 2 shows the comparative melt viscosity of copolymers in accordance with the invention and polycarbonate homopolymers lacking the polyester component.

Viscosity measurements were made on the products of Examples 1,2 3 and 5 to determine the viscosity profile at 240 decrees C. As shown in FIG. 2, copolymer samples Example 1 (MW=$5.1 \times 10^4$) and example 5 (MW=$5.44 \times 10^4$) have the same or lower melt viscosity than comparative homopolymer of MW=$4.44 \times 10^4$. Since higher molecular weight gives improved polymer ductility due to entanglements it is desirable, but higher molecular weight also generally causes higher melt viscosity and thus lower melt flow. Lower melt flow means that it is more difficult to mold parts quickly with complicated structures. Thus, having a high molecular weight polymer but with improved flow (softblock copolymer) versus homopolymers of similar molecular weight is an advantage. Alternatively, the flow-ductility balance can be improved by maintaining molecular weight and thus the polymer ductility but introducing soft blocks to improve the flow.

What is claimed is:

1. A method for producing a poly(carbonate-co-ester) copolymer, comprising the steps of:
    (a) creating a reaction mixture comprising an aromatic dihydroxy compound, a carbonic acid diester, and a catalyst,
    (b) mixing a polyester prepolymer with the reaction mixture,
    (c) bringing the reaction mixture to thermal equilibrium in a melted condition, the reaction mixture under thermal equilibrium further comprising a volatile component and a polycarbonate polymer, and
    (d) removing the volatile component from the reaction mixture to increase the molecular weight (Mw) of the polycarbonate.

2. The method of claim 1, wherein the polyester prepolymer comprises the following structure:

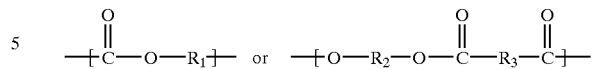

wherein the groups $R_1$, $R_2$, and $R_3$ may vary within the same prepolymer and represent an aryl group, an aralkyl group, a branched $C_1$–$C_{40}$ alkyl group, a linear $C_1$–$C_{40}$ alkyl group, a branched $C_1$–$C_{40}$ alkoxy group, or a linear $C_1$–$C_{40}$ alkoxy group.

3. The method of claim 2, wherein the polyester prepolymer is synthesized from reactants, the reactants comprising at least one diol and at least one diacid, with each diol possessing the $R_2$ group.

4. The method of claim 2, wherein the $R_2$ group for each diol is selected from the group consisting of hexanediol, ethylene glycol, propylene glycol, butanediol, pentanediol, neopentyl glycol, heptanediol, octanediol, decanediol, and dodecanediol.

5. The method of claim 2, wherein at least one diacid is selected from the group consisting of carbonic acid, oxalic acid, succinic acid, glutaric acid, adipic acid, pimelic acid, sebacic acid, decanedioic acid, dodecanedioic acid, $C_{36}$ acid, isophthalic acid and terephthalic acid.

6. The method of claim 2, wherein R1 is caprolactone.

7. The method of claim 2, wherein the polyester prepolymer comprises two end groups, with each end group either identical or different from each other, said end groups selected from the group consisting of an alcohol, a carboxylic acid, an alkyl ester, a phenyl ester, an arylester, or an aralkylester.

8. The method of claim 2, wherein the polyester prepolymer has a molecular weight (Mw) less than about 3250 g/mol.

9. The method of claim 1, wherein the aromatic dihydroxy compound is a bisphenol.

10. The method of claim 9, wherein the bisphenol is bisphenol A.

11. The method of claim 1, wherein the carbonic acid diester is diphenyl carbonate.

12. The method of claim 1, wherein the catalyst comprises tetramethylammonium hydroxide.

13. The method of claim 12, wherein the catalyst further comprises sodium hydroxide.

14. The method of claim 1, wherein the heating of the reaction mixture to melt the reaction mixture and to achieve thermal equilibrium is conducted under a non-reactive gas.

15. The method of claim 14, wherein the non-reactive gas is selected from the group consisting of nitrogen, argon, and helium.

16. The method of claim 14, wherein the heating of the reaction mixture is conducted under a pressure of less than about one atmosphere of the inert gas.

17. The method of claim 14, wherein the heating of the reaction mixture is conducted under a pressure between about 0.5 and about 1.6 mbar of the inert gas.

18. The method of claim 14, wherein the heating of the reaction mixture is conducted under a pressure between about 1.6 and about 170 mbar of the inert gas.

19. The method of claim 1, wherein the heating of the reaction mixture to establish thermal equilibrium is conducted between about 180° and about 300 C.

20. The method of claim 1, wherein the mixing of the polyester prepolymer occurs after the reaction mixture has established thermal equilibrium.

21. The method of claim 20, wherein the mixing of the polyester prepolymer with the reaction mixture occurs after the molecular weight (Mw) of the polycarbonate has reached at least 3000 grams per mole.

22. The method of claim 20, wherein the mixing of the polyester prepolymer with the reaction mixture occurs after the molecular weight (Mw) of the polycarbonate has reached at least 5000 grams per mole.

23. The method of claim 20, wherein the mixing of the polyester prepolymer with the reaction mixture occurs after the molecular weight (Mw) of the polycarbonate has reached at least 10,000 grams per mole.

24. The method of claim 1, wherein the mixing of the polyester prepolymer with the reaction mixture occurs prior to the reaction mixture establishing thermal equilibrium.

25. The method of claim 1, wherein a static mixer mixes the polyester prepolymer with the reaction mixture.

26. The method of claim 1, wherein a melt kneader mixes the polyester prepolymer with the reaction mixture.

27. The method of claim 1, wherein the mixing of the reaction mixture with a polyester prepolymer occurs by means of solid state polymerization.

28. A method for making a poly(carbonate-co-ester) copolymer, the method comprising:
   (a) synthesizing a polycarbonate block from a reaction mixture, the reaction mixture comprising a dihydroxy compound and a diester carbonate; and
   (b) introducing a polyester prepolymer to the reaction mixture during the synthesizing of the polycarbonate block.

29. The method of claim 28, wherein the polyester prepolymer comprises the following structure:

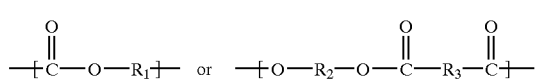

wherein the groups $R_1$, $R_2$, and $R_3$ may vary in the same prepolymer and represent an aryl group, an aralkyl group, a branched $C_1$–$C_{40}$ alkyl group, a linear $C_1$–$C_{40}$ alkyl group, a branched $C_1$–$C_{40}$ alkoxy group, or a linear $C_1$–$C_{40}$ alkoxy group.

30. The method of claim 29, wherein the polyester prepolymer is synthesized from reactants, the reactants comprising at least one diol and at least one diacid, with each diol possessing the $R_2$ group.

31. The method of claim 29, wherein the $R_2$ group for each diol is selected from the group consisting of hexanediol, ethylene glycol, propylene glycol, butanediol, pentanediol, neopentyl glycol, heptanediol, octanediol, decanediol, and dodecanediol.

32. The method of claim 29, wherein at least one diacid is selected from the group consisting of carbonic acid, oxalic acid, succinic acid, glutaric acid, adipic acid, pimelic acid, sebacic acid, decanedioic acid, dodecanedioic acid, $C_{36}$ acid, isophthalic acid and terephthalic acid.

33. The method of claim 29, wherein the repeat unit C(=O)—O—R1 is caprolactone.

34. The method of claim 29, wherein the polyester prepolymer comprises two end groups, with each end group either identical or different from each other, said end groups selected from the group consisting of an alcohol, a carboxylic acid, an alkyl ester, a phenyl ester, an arylester, or an aralkylester.

35. The method of claim 29, wherein the polyester prepolymer has a molecular weight (Mw) less than about 3250 g/mol.

36. The method of claim 28, wherein the aromatic dihydroxy compound is a bisphenol.

37. The method of claim 36, wherein the bisphenol is bisphenol A.

38. The method of claim 28, wherein the carbonic acid diester is diphenyl carbonate.

39. The method of claim 28, wherein the catalyst comprises tetramethylammonium hydroxide.

40. The method of claim 28, wherein the catalyst further comprises sodium hydroxide.

41. The method of claim 28, wherein the heating of the reaction mixture to melt the reaction mixture and to achieve thermal equilibrium is conducted under a non-reactive gas.

42. The method of claim 41, wherein the non-reactive gas is selected from the group consisting of nitrogen, argon, and helium.

43. The method of claim 41, wherein the heating of the reaction mixture is conducted under a pressure of less than about one atmosphere of the non-reactive gas.

44. The method of claim 41, wherein the heating of the reaction mixture is conducted under a pressure between about 0.5 and about 1.6 mbar of the non-reactive gas.

45. The method of claim 41, wherein the heating of the reaction mixture is conducted under a pressure between about 1.6 and about 170 mbar of the inert gas.

46. The method of claim 39, wherein the heating of the reaction mixture to establish thermal equilibrium is conducted between about 180 and about 300° C.

47. The method of claim 28, wherein the mixing of the polyester prepolymer occurs after the reaction mixture has established thermal equilibrium.

48. The method of claim 47, wherein the mixing of the polyester prepolymer with the reaction mixture occurs after the molecular weight (Mw) of the polycarbonate has reached at least 3000 grams per mole.

49. The method of claim 47, wherein the mixing of the polyester prepolymer with the reaction mixture occurs after the molecular weight (Mw) of the polycarbonate has reached at least 5000 grams per mole.

50. The method of claim 47, wherein the mixing of the polyester prepolymer with the reaction mixture occurs after the molecular weight (Mw) of the polycarbonate has reached at least 10,000 grams per mole.

51. The method of claim 28, wherein the mixing of the polyester prepolymer with the reaction mixture occurs prior to the reaction mixture establishing thermal equilibrium.

52. The method of claim 28, wherein a static mixer mixes the polyester prepolymer with the reaction mixture.

53. The method of claim 28, wherein a melt kneader mixes the polyester prepolymer with the reaction mixture.

54. The method of claim 28, wherein the mixing of the reaction mixture with a polyester prepolymer occurs by means of solid state polymerization.

55. A poly(carbonate-co-ester) soft-block copolymer comprising at least one region of a polycarbonate formed from a diarylcarbonate and a bisphenol and one region of a polyester, said polyester being formed as a prepolymer from a diacid or diol, optionally modified through the addition of end groups, wherein the copolymer has a glass transition temperature Tg in the range of from 110 to 160 degrees C.

56. The copolymer of claim 55, wherein the copolymer contains less than 3 weight percent of polyester prepolymer that is not incorporated in the copolymer.

57. The copolymer of claim 56, wherein the copolymer contains less than 2 weight percent of polyester prepolymer that is not incorporated in the copolymer.

58. The copolymer of claim 56, wherein the copolymer contains less than 1 weight percent of polyester prepolymer that is not incorporated in the copolymer.

59. The copolymer of claim 56, wherein the copolymer contains less than 0.5 weight percent of polyester prepolymer that is not incorporated in the copolymer.

60. The copolymer of claim 55, wherein the copolymer has a glass transition temperature Tg in the range of from 120 to 150 degrees C.

61. The copolymer of claim 55, wherein the polyester is formed as a prepolymer of a diacid and the molar ratio of components in the copolymer can be expressed by the formula $$\text{diaryl carbonate} = f \times (\text{bisphenol} + 2 \times \text{diacid})$$

where f is between 1 and 1.3.

62. The copolymer of claim 61, wherein f is between 1.05 and 1.1.

63. The copolymer of claim 55, wherein the polyester is formed as a prepolymer of a diol and the molar ratio of components in the copolymer can be expressed by the formula $$\text{diaryl carbonate} = f \times (\text{bisphenol} + \text{diol})$$

where f is between 1 and 1.3.

64. The copolymer of claim 63, wherein f is between 1.05 and 1.1.

65. The copolymer of claim 55, wherein the polyester is formed as a prepolymer of a diacid with added diphenyl ester end groups, and the molar ratio of components in the copolymer can be expressed by the formula $$\text{diaryl carbonate} + \text{diphenylester prepolymer} = f \times \text{bisphenol}$$

wherein f is between 1 and 1.3.

66. The copolymer of claim 65, wherein f is between 1.05 and 1.1.

67. The copolymer of claim 55, wherein the molecular weight (Mw) of the copolymer is in the range of $1 \times 10^4$ to $1 \times 10^5$ g/mol.

68. The copolymer of claim 55, wherein the molecular weight (Mw) of the copolymer is in the range of $2 \times 10^4$ to $8 \times 10^4$ g/mol.

69. The copolymer of claim 55, wherein the molecular weight (Mw) of the copolymer is in the range of $2.5 \times 10^4$ to $6 \times 10^4$ g/mol.

70. The copolymer of claim 55, wherein the copolymer has a melt viscosity that is less than the melt viscosity of a polycarbonate homopolymer of the same molecular weight (Mw), lacking the polyester component.

\* \* \* \* \*